US008130852B2

(12) United States Patent
Choi et al.

(10) Patent No.: US 8,130,852 B2
(45) Date of Patent: Mar. 6, 2012

(54) METHOD FOR ESTIMATING CHANNEL IN RADIO COMMUNICATION SYSTEM AND DEVICE THEREFOR

(75) Inventors: Hyung-Jin Choi, Seoul (KR); Se-Bin Im, Suwon-si (KR)

(73) Assignee: Sungkyunkwan University Foundation for Corporate Collaboration, Suwon (KR)

( * ) Notice: Subject to any disclaimer, the term of this patent is extended or adjusted under 35 U.S.C. 154(b) by 600 days.

(21) Appl. No.: 12/345,936

(22) Filed: Dec. 30, 2008

(65) Prior Publication Data

US 2010/0128807 A1    May 27, 2010

(30) Foreign Application Priority Data

Nov. 21, 2008    (KR) .................. 10-2008-0116480

(51) Int. Cl.
H04L 27/28 (2006.01)
(52) U.S. Cl. ....................................... 375/260
(58) Field of Classification Search .................. 375/142, 375/143, 144, 148, 150, 152, 260, 316, 343, 375/346; 455/59, 63.1, 114.2, 278.1; 370/281, 370/295
See application file for complete search history.

(56) References Cited

U.S. PATENT DOCUMENTS

| 7,362,832 | B2 * | 4/2008 | Yoshida | 375/348 |
| 7,535,979 | B2 * | 5/2009 | Mudulodu et al. | 375/347 |
| 7,940,848 | B2 * | 5/2011 | Fechtel | 375/260 |
| 2005/0163262 | A1 * | 7/2005 | Gupta | 375/343 |
| 2008/0112386 | A1 * | 5/2008 | Ogawa et al. | 370/345 |
| 2009/0131123 | A1 * | 5/2009 | Coersmeier et al. | 455/574 |
| 2009/0225741 | A1 * | 9/2009 | Wang et al. | 370/345 |

* cited by examiner

Primary Examiner — Sam K Ahn
(74) Attorney, Agent, or Firm — David R. Yohannan; Kelley Drye & Warren LLP

(57) ABSTRACT

Disclosed is a radio communication device, and more particularly to a method for estimating a channel and compensating for error occurring in the estimation procedure, for a device for performing a frequency domain signal processing, such as Orthogonal Frequency Division Multiplexing (OFDM) The channel estimation method in a radio communication system includes the steps of: transforming a received OFDM signal into a frequency domain; estimating a channel frequency response (CFR) value from a result value obtained through the transformation by using a pilot signal; transforming the estimated CFR value into a time domain through an extended Inverse Fast Fourier Transform scheme, and detecting a channel impulse response (CIR) value; detecting a delay path position of a channel; modifying a non-ideal autocorrelation function; and compensating the estimated CIR value for error, through use of the detected delay path position and the non-ideal autocorrelation function.

10 Claims, 10 Drawing Sheets

METHOD FOR ESTIMATING CHANNEL IN RADIO COMMUNICATION SYSTEM AND DEVICE THEREFOR

BACKGROUND OF THE INVENTION

1. Field of the Invention

The present invention relates to a radio communication device, and more particularly to a method for estimating a channel and compensating for error occurring in an estimation procedure in a system where a frequency domain signal processing, such as Orthogonal Frequency Division Multiplexing (OFDM), is performed.

2. Description of the Prior Art

In radio communication environments, received signals have a frequency-selective power spectrum characteristic due to transmission delay caused by a multipath. In order to compensate for such a distortion on channels, various channel estimation schemes have been studied.

Among channels estimation schemes, a Linear Mean Square Error (LMMSE) channel estimation scheme has been widely known as a scheme of minimizing estimation error caused by noise. However, the LMMSE channel estimation scheme has disadvantages in that a large number of calculations are required to obtain the statistical characteristic of a channel, the implementation complexity is high, and a processing delay time increases. That is, it is difficult to employ the LMMSE channel estimation scheme due to the burden of implementing a receiver.

In order to solve such a problem, various schemes modified to have a low complexity are being proposed. A Discrete Fourier Transform (DFT)-based channel estimation scheme, which is one of the modified schemes, has a characteristic of removing a predetermined amount of noise, regardless of the statistical characteristic of a channel. Also, a Correlation Error Cancellation (CEC) scheme has been widely known as a scheme of efficiently removing estimation error, which occurs in the DFT-based channel estimation scheme, without a large increase in complexity. However, such complexity reduction schemes cause serious estimation error when they are employed in an actual radio channel environment.

A representative cause of estimation error is a dense multipath channel environment, and a general radio channel environment, where it cannot be guaranteed that the length of a transmission delay is modeled by integer times of a sample space, may be regarded as a cause of error in channel estimation.

Generally, in an OFDM-based radio communication system for commercial use, a guard band is set within a band available for transmission, in order to minimize interference with adjacent communication channels and to facilitate application of a digital filter. That is, data and a pilot are transmitted through subcarriers within a useful band while no signal is transmitted through subcarriers within the guard band. Such subcarriers are called useful subcarriers and virtual subcarriers, respectively.

FIG. 1 is a conceptual view illustrating a method of setting virtual subcarriers within a guard band. Generally, guard bands are positioned at both ends of a frequency spectrum.

Meanwhile, such a setting of a guard band makes it difficult to implement a channel estimator based on time-domain channel impulse response (CIR) estimation. Generally, the initial channel estimation in an OFDM system is performed through a pilot subcarrier signal, established between a transmitter and a receiver, among useful subcarriers in the frequency domain, wherein various interpolation schemes are used to perform a channel estimation of a data subcarrier location. In addition, various advanced schemes may be additionally employed to minimize estimation error due to noise.

For example, the DFT-based channel estimation scheme is implemented in such a manner as to transform a channel frequency response (CFR) value, which has been obtained from an initial channel estimator, into the form of a channel impulse response (CIR) through Inverse Fast Fourier Transform (IFFT), and then to remove noise. Such a noise removal scheme intends to enhance the channel estimation performance, but may degrade rather than enhance the performance due to a wrong operation of removing even useful channel components in a noise removal procedure in the OFDM system, where a guard band has been set.

In this case, in order to compensate for channel estimation error occurring in the noise removal procedure, a correlation error cancellation (CEC) scheme is employed.

The conventional channel estimation error compensation procedure roughly includes four steps as follows.

In step 1, an initial channel impulse response (CIR) value is stored.

In step 2, a sample position of a CIR having the highest power is estimated. In a repeated execution step, the formerly estimated highest power's position is excluded.

In step 3, correlation error is removed based on the CIR value having the highest power, which has been estimated in step 2. In this step, a non-ideal autocorrelation function is used.

Steps 2 and 3 are repeated until predetermined conditions are satisfied.

However, the conventional error compensation scheme in the channel estimation roughly has two problems.

First, when delay positions of a channel aggregate densely, new error is caused by interference between CIR values of corresponding positions. In this case, when a scheme of removing errors one by one from the channel's position having the highest power, like the conventional method, is used, it is impossible to remove the error caused by the interference. Also, since the employed non-ideal autocorrelation function is set based on integer times sample spaces, the error compensation scheme cannot be successfully performed if the delay positions of the channel do not correspond to integer times of the sample space.

This will now be described in detail.

FIGS. 2A and 2B are views explaining the conventional DFT-based channel estimation method.

FIG. 2A is a view showing an example of power distribution according to delay positions of a channel, which is estimated in a receiving side. In FIG. 2A, the values of Number 10, 20, and 30 represent channel impulse response (CIR) values of a channel, and the signal values of the other positions represent noise components. That is, transmission signals are delayed and received to the positions of Numbers 10, 20, and 30 due to a multi-path channel, respectively, and reception signals have power components corresponding to Number 10, 20, and 30, respectively. Also, random noise is distributed in discrete sample positions along a delay time axis. The conventional DFT-based channel estimation scheme is implemented in such a manner as to set a predetermined threshold value for the purpose of detecting a channel impulse response (CIR) of a channel and removing noise, and to remove all signals having a power component equal to or less than the threshold value in order to enhance the channel estimation performance. In this case, after noise has been removed, only useful channel components remain, as shown in FIG. 2B.

However, FIGS. 2A and 2B are only ideal estimation examples, but in reality, such a result is not obtained due to a guard band and a non-sample-spaced channel delay position. That is, a phenomenon where impulse responses are not in a precisely separated form, but is dispersed to both sides, thereby causing power loss, is caused.

FIGS. 3A and 3B are views explaining the conventional CEC scheme.

FIG. 3A is a view illustrating a non-ideal autocorrelation function dispersed due to existence of a guard band (In a real calculation, only power components are illustrated for convenience of illustration and processing of complex numbers). The function can be estimated through a determined transmission signal structure. FIG. 3B illustrates a power distribution of a real channel which can be observed by a receiving side (wherein noise components are not illustrated for convenience of description). The graph of FIG. 3B is identical to a result of convolution of the non-ideal autocorrelation function with the channel impulse response (CIR) values, shown in FIG. 3A. The channel error compensation by the CEC scheme intends to transform channel components in a dispersed form into a form as shown in FIG. 2B. That is, based on the CIR value (i.e. Number 10) having the highest power, channel components dispersed at both sides are removed in the form of the non-ideal autocorrelation function. Also, with respect to the CIR value (i.e. Number 20) having the second highest power and the CIR value (i.e. Number 30) having the third highest power, the same procedure is successively performed.

However, when delay positions of a channel are adjacent to each other, the CEC scheme causes a wrong operation due to an initial mutual interference. FIGS. 4A to 4C are views showing a first example for explaining a wrong operation in the convention channel estimation error compensation scheme (i.e. the CEC scheme). FIG. 4A illustrates an ideal power distribution of a channel with adjacent delay positions, and FIG. 4B illustrates a power distribution of a channel, which can be observed by a receiving side. FIG. 4B shows a phenomenon where the respective mutually adjacent CIR values (i.e. Numbers 10 and 20) are dispersed to both sides, and cause mutual interference, and such a phenomenon causes initial error at each CIR position. Accordingly, when the CEC scheme is performed based on a CIR value including initial error, channel components existing at both sides are not sufficiently removed. FIG. 4C shows a result of a wrong operation caused by the CEC. Consequently, the channel components remaining around Numbers 10 and 20 cause new channel error. Meanwhile, in the case of the CIR value (i.e. Number 30) which is relatively far away, since initial error caused by the mutual interference is very small, there is few channel component remaining in adjacent positions.

FIGS. 5A to 5C are views showing a second example for explaining a wrong operation in the convention channel estimation error compensation scheme (i.e. the CEC scheme). FIG. 5A shows an ideal power distribution of a channel which does not have a delay position corresponding to integer times sample spaces CIR values (Numbers 20 and 30) of non-sample positions illustrated in FIG. 5A are actually divided into Numbers 21 and 22 and Numbers 31 and 32, respectively, and appear, as shown in FIG. 5B. Also, adjacent channel components are dispersed based on CIR values of Numbers 10, 20, and 30. In this case, CIR values having the highest powers, which can be observed by a receiving side, correspond to Number 10, Number 21, Number 22, Number 31, and Number 32 in regular sequence, and, when the CEC scheme is performed based on the CIR values, new channel error occurs as shown in FIG. 5C.

Therefore, when the conventional channel estimation error compensation scheme is applied in a general wireless channel environment, where it cannot be guaranteed that the length of a transmission delay is modeled by integer times of a sample space, the reception performance is degraded.

SUMMARY OF THE INVENTION

Accordingly, the present invention has been made to solve the above-mentioned problems occurring in the prior art, and an object of the present invention is to solve the problems of the conventional channel estimation error compensation method. That is, the present invention provides an error estimation method and a radio communication device using the same, more suitable to the real channel environment, where error occurs due to dense delay positions of a multi-path channel, and a delay position not corresponding to integer times of a discrete sample space exists.

In accordance with an aspect of the present invention, there is provided a channel estimation method in a radio communication system including the steps of: transforming a received OFDM signal into a frequency domain; estimating a channel frequency response (CFR) value from a result value obtained through the transformation by using a pilot signal; transforming the estimated CFR value into a time domain through an extended Inverse Fast Fourier Transform scheme, and detecting a channel impulse response (CIR) value; detecting a delay path position of a channel; modifying a non-ideal autocorrelation function; and compensating the estimated CIR value for error, through use of the detected delay path position and the non-ideal autocorrelation function.

Preferably, the delay path position and the non-ideal autocorrelation function are constructed in the form of a matrix, and the step of compensating the estimated CIR value for error is performed in such a manner as to calculate a channel estimation error cause matrix from the delay path position matrix and the non-ideal autocorrelation matrix, and then to compensate the estimated CIR value for the channel estimation error cause matrix through an inverse matrix operation.

Preferably, the step of compensating the estimated CIR value for error is performed by calculating:

$$h_{prop.1} = \psi_{prop.1} \tilde{h}_{LS}, (\psi_{prop.1} = \tilde{D}^T(\tilde{D}\tilde{Q}\tilde{D}^T)^{-1}\tilde{D}),$$

wherein $h_{prop.1}$ represents an estimated CIR matrix, $[\tilde{D}]_{n,k} = \delta[n-1] \cdot \delta[k-\tau], (0 \leq n, 1 < \overline{L}, 0 \leq k < M)$, and $\overline{\tau}_l$ represents a detected delay path position.

Preferably, the step of compensating the estimated CIR value for error is performed by calculating:

$$h_{prop.2}^{(i)} = \tilde{D}^T(\tilde{D}h_{prop.2}^{(i)} + Z_{diag}^{-1} Z_{off-diag} \tilde{D} h_{prop.2}^{(i-1)}),$$
$$(h_{prop.2}^{(0)} = \tilde{h}_{LS}),$$

wherein $Z_{diag}$ represents a matrix constituted by only diagonal components of $Z = \tilde{D}\tilde{Q}\tilde{D}^T$, $Z_{off-diag}$ represents a matrix constituted by only off-diagonal components of $Z = \tilde{D}\tilde{Q}\tilde{D}^T$, and "(i)" represents the number of iterations.

Preferably, the "(i)" has a value selected from a range of three to ten.

Preferably, the step of transforming the estimated CFR value into a time domain is performed through Inverse Fast Fourier Transform, and the size of an Inverse Fast Fourier Transform unit is extended by the power of 2.

In accordance with another aspect of the present invention, there is provided a channel estimation device including: a first Fast Fourier Transform unit for transforming a received OFDM signal into a frequency domain; a channel estimation unit channel for estimating a channel frequency response (CFR) value from a result value obtained through the transformation by using a pilot signal; an Inverse Fast Fourier Transform unit for transforming the estimated CFR value into a time domain through an Inverse Fast Fourier Transform scheme, and detecting a channel impulse response (CIR) value; a delay path detection unit for detecting a delay path position; and a channel estimation error compensation unit for calculating a modified non-ideal autocorrelation function, and compensating the estimated CIR value for an error value, through use of the delay path position and the non-ideal autocorrelation function.

Preferably, the delay path position and the non-ideal autocorrelation function are constructed in the form of a matrix, and the channel estimation error compensation unit calculates a channel estimation error cause matrix using the delay path position matrix and the non-ideal autocorrelation matrix, and performs a calculation operation of applying the channel estimation error cause matrix to the estimated CIR value in the form of an inverse matrix.

Preferably, the Inverse Fast Fourier Transform unit transforms the estimated channel frequency response (CFR) value into a time domain through Inverse Fast Fourier Transform, and extends a size of Inverse Fast Fourier Transform by the power of 2 when the Inverse Fast Fourier Transform is performed.

Preferably, the radio communication system is based on one among IEEE 802.16d/e standard, WiBro, and WiMAX.

As described above, according to the channel estimation method in a radio communication system, provided by the present invention, it is possible to largely enhancing the performance of a channel estimation unit which can be used in the general radio channel environments.

That is, the present invention provides a method more suitable to the real channel environment, where error occurs due to dense delay positions of a multi-path channel, and a delay position not corresponding to integer times of a discrete sample space exists, thereby being able to provide a radio communication system having much higher performance.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

Hereinafter, an exemplary embodiment of the present invention will be described in more detail with reference to the accompanying drawings.

Figure 1:
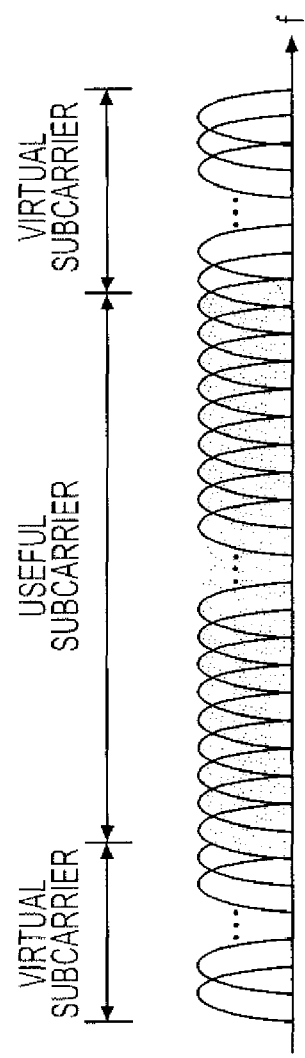
FIG. 1 is a conceptual view illustrating a method of setting virtual subcarriers within a guard band.
Figure 2A:
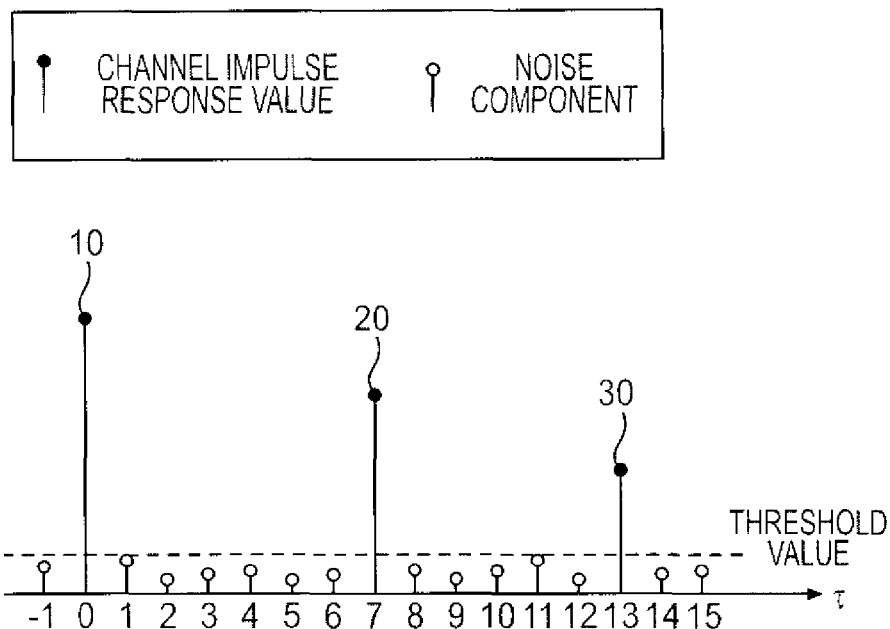
FIGS. 2A and 2B are views explaining the conventional DFT-based channel estimation method.
Figure 2B:
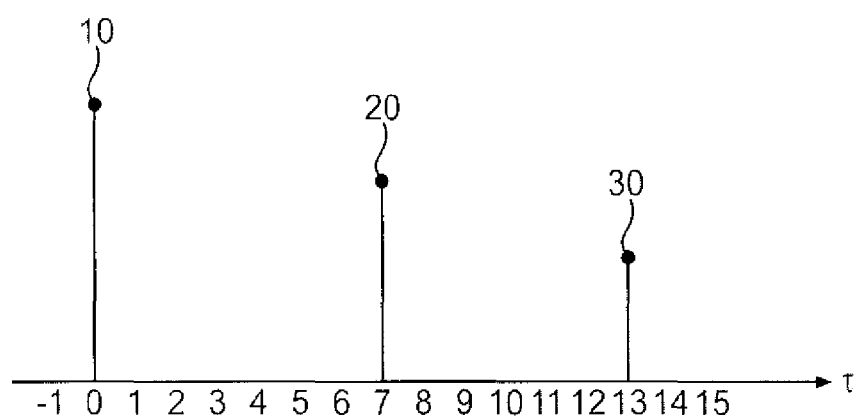
Figure 3A:
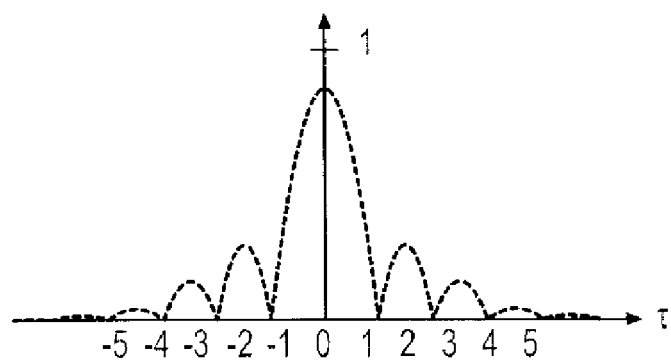
FIGS. 3A and 3B are views explaining the conventional CEC scheme.
Figure 3B:
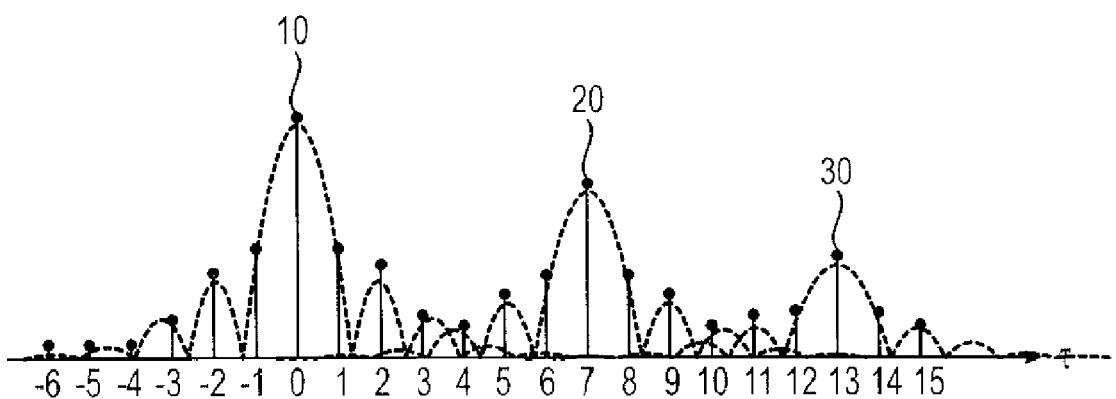
Figure 4A:
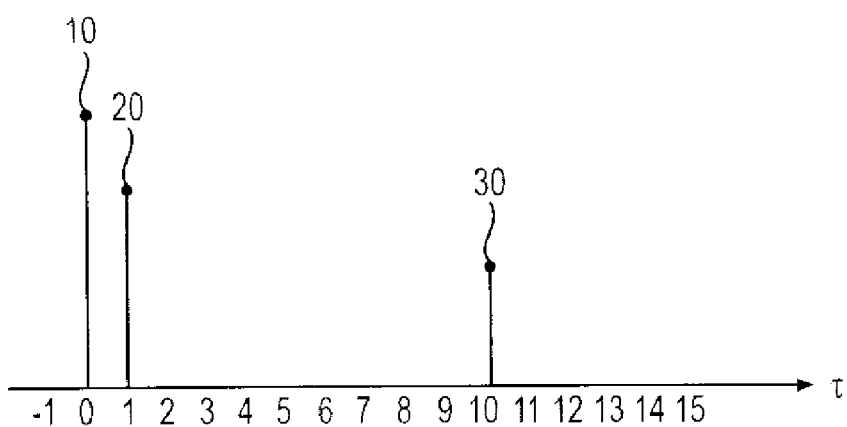
FIGS. 4A to 4C are views showing an example where new error occurs due to mutual interference.
Figure 4B:
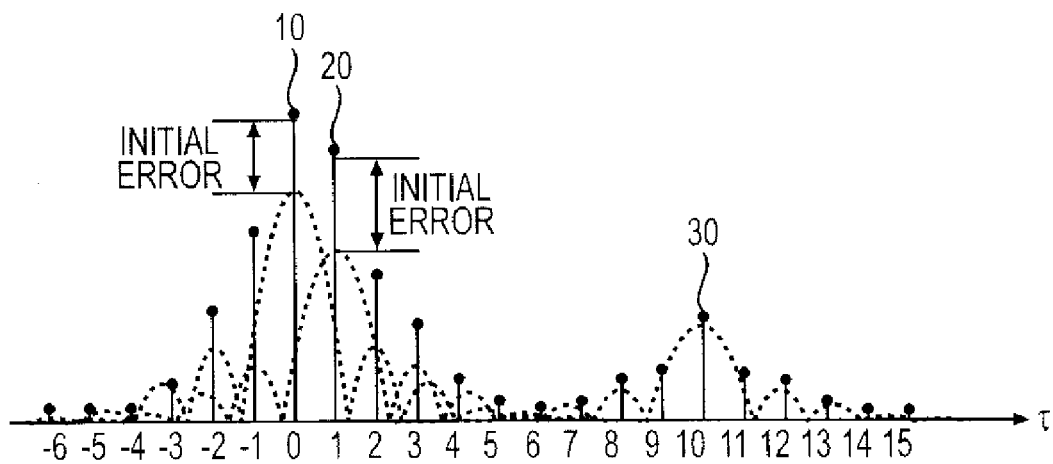
Figure 4C:
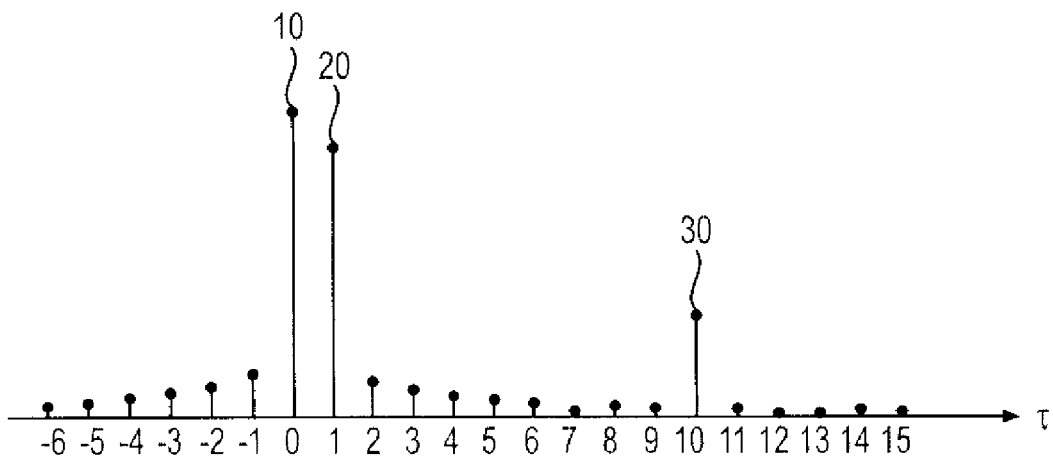
Figure 5A:
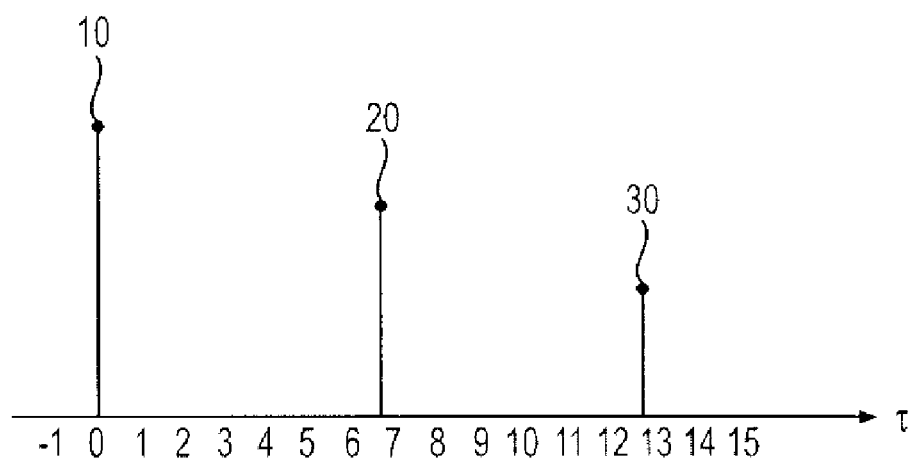
FIGS. 5A to 5C are views showing a cause of error in channel estimation when the length of a transmission delay does not correspond to integer times of a sample space.
Figure 5B:
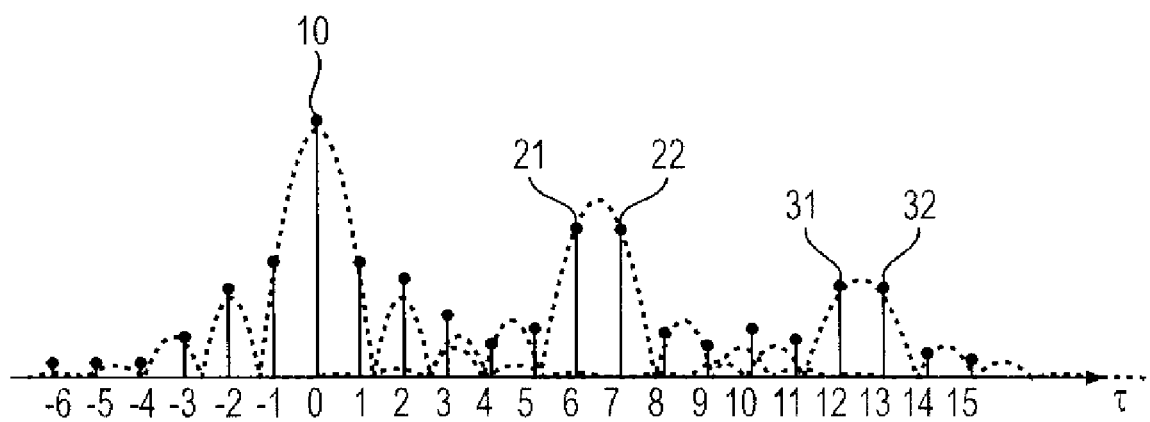
Figure 5C:
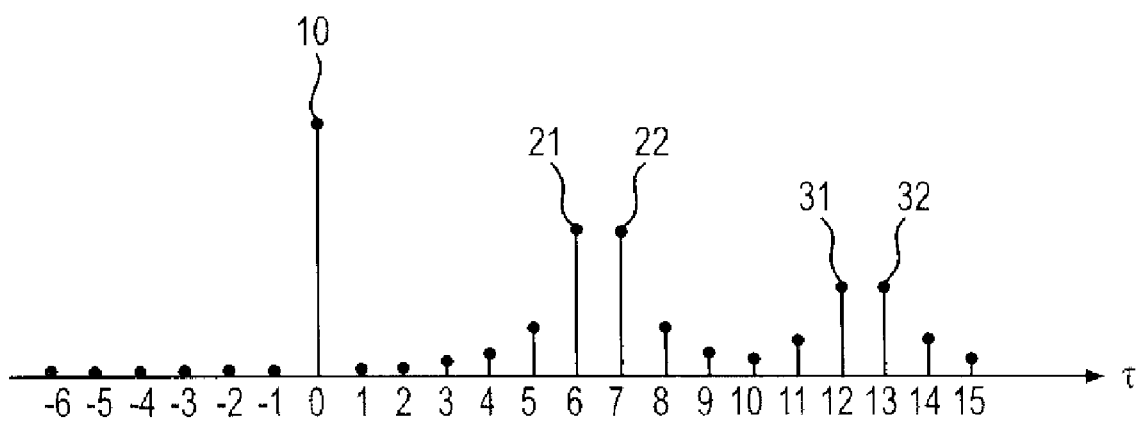
Figure 6:
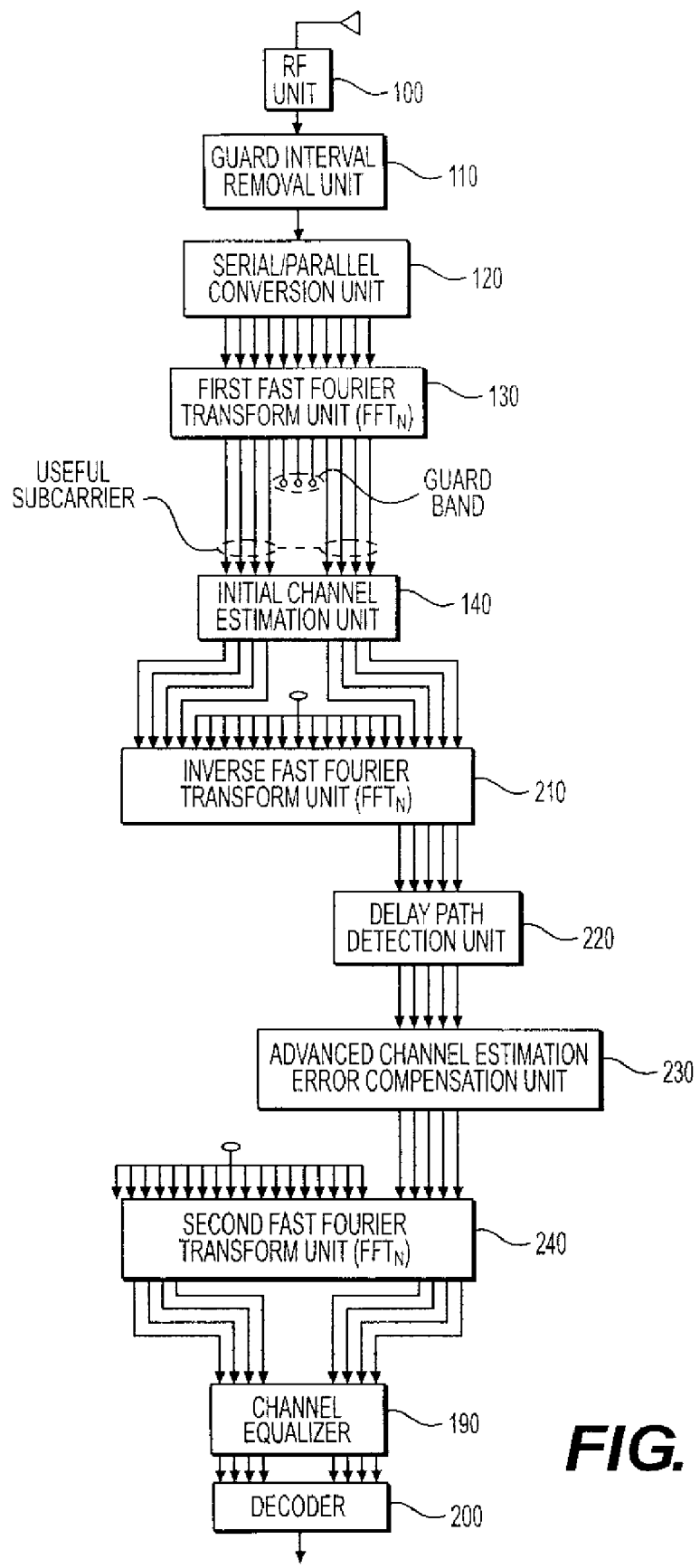
FIG. 6 is a block diagram illustrating the configuration of a radio communication device, showing the operation procedure of a channel estimation error compensation method according to an exemplary embodiment of the present invention.

FIG. 6 is a block diagram illustrating the operation procedure of a channel estimation error compensation method according to an exemplary embodiment of the present invention.

A signal received by a receiving-side antenna is transformed into a baseband discrete signal through an RF unit 100. On the assumption that time and frequency synchronizations have been sufficiently achieved, in the next step, a guard interval removal unit 110 removes a guard interval in an OFDM symbol.

In the next step, a serial/parallel conversion unit 120 converts a signal stream input in serial into parallel signals. The parallel signals are simultaneously input to a first Fast Fourier Transform unit 130, and is subjected to a Fourier transformation. In this case, the signal is transformed from a time domain to a frequency domain. A part of the output of the first Fast Fourier Transform unit 130 corresponds to a useful subcarrier signal and is transferred to an initial channel estimation unit 140, and the remaining part of the output corresponds to a virtual subcarrier signal and is discarded. The initial channel estimation unit 140 estimates an approximate channel frequency response (CFR) value corresponding to a radio channel distortion by using a pilot signal established between a transmitter and a receiver.

In this case, in order to reduce error in noise estimation, a modified DFT-based channel estimation scheme is employed. The modified DFT-based channel estimation is performed by an Inverse Fast Fourier Transform unit 210, a delay path detection unit 220, and a second Fast Fourier Transform unit 240.

A channel estimation error compensation unit 230 is located between the delay path detection unit 220 and the second Fast Fourier Transform unit 240.

Explaining this procedure, first, a channel frequency response (CFR) value obtained from the initial channel estimation unit 140 is input to the Inverse Fast Fourier Transform unit 210 with respect to a useful subcarrier position, and is transformed into a time domain. In this case, the transformed time-domain channel value corresponds to an estimation value of a channel impulse response (CIR), and includes error due to setting of a guard band and the characteristics of a radio channel.

The delay path detection unit 220 detects a multi-path delay position of a radio channel, and the channel estimation error compensation unit 230 according to the present invention compensates the estimated CIR value for error components based on the detected position.

In the next step, the channel value is transformed into a frequency domain through the second Fast Fourier Transform unit 240. Using the transformed channel frequency response (CFR) value, a channel equalizer 190 performs an equalization operation on a channel distortion of the frequency-domain reception signal.

The equalized signal is decoded to data bit information through a decoder 200.

The aforementioned procedure may be expressed mathematically as follows.

First, a baseband discrete signal, having passed the receiving-side RF unit 100 and guard interval removal unit 110, is expressed as equation 1. However, for convenience of description of the present invention, the expression of equation 2 is converted in the form of matrix and vector, as shown in equation 1.

$$Y = XH + W = XF_N h + W \quad (1)$$

In equation 1, Y, H, and W represent vectors having a reception signal "Y[k]," a transmission signal "H[k]," and a noise "W[k]" as elements, respectively, and X represents a matrix having "X[k]" as a diagonal component. In addition, $F_N$ represents a matrix for a Fast Fourier Transform procedure.

A detailed description of equation 1 will be given with reference to equation 2.

$$Y = [Y[0]Y[1]\ldots Y[N-1]]^T \quad (2)$$
$$H = [H[0]H[1]\ldots H[N-1]]^T$$
$$W = [W[0]W[1]\ldots W[N-1]]^T$$
$$[X]_{n,k} = \begin{cases} X[k], & (n=k) \\ 0, & (n \neq k) \end{cases}$$
$$[F_N]_{n,k} = \exp(-j2\pi nk/N), (0 \leq k, n < N)$$

In equation 2, "$[.]_{n,k}$" represents an $n^{th}$ row and a $k^{th}$ column in a matrix.

The operation of the initial channel estimation unit 140 is changed in the form of a matrix as equation 3.

$$H_{LS} = X^H Y = GF_N h + W', \quad (W' = GX^H W) \quad (3)$$

In equation 3, $H_{LS}$ represents a vector having $H_{LS}[k]$ as an element, and G represents a matrix having G[k] as a diagonal component.

According to the channel impulse response (CIR) estimation process by the Inverse Fast Fourier Transform unit 210, differently from that by the conventional Inverse Fast Fourier Transform unit 150, size N Inverse Fast Fourier Transform is extended to size M (wherein M>N) and is applied. In this case, the M must be set to N multiplied by a power of 2).

Through such a procedure, the probability that the length of a transmission delay will be modeled by integer times of a sample space is increased.

$$\tilde{h}_{LS} = F_M^{-1} \tilde{G}^T H_{LS} = \tilde{Q}\tilde{h} + \tilde{w}', \quad (\tilde{Q} = F_M^{-1} \tilde{G}^T \tilde{G} F_M, \tilde{w}' = F_M^{-1} \tilde{G}^T X^{-1} W) \quad (4)$$

In equation 4, $h_{LS}$ represents a vector having $h_{LS}[n]$ as an element, and $\tilde{Q}$ represents a matrix of a modified non-ideal autocorrelation function.

In addition, $\tilde{G}$ is expressed as equation 5.

$$\tilde{G} = \begin{bmatrix} I_{(A \times A)} & 0_{(A \times C)} & 0_{(A \times A)} \\ 0_{(B \times A)} & 0_{(B \times C)} & 0_{(B \times A)} \\ 0_{(A \times A)} & 0_{(A \times C)} & I_{(A \times A)} \end{bmatrix}_{(N \times M)} \quad (5)$$
$$\begin{pmatrix} A = (N - N_V)/2 \\ B = N_V, C = M - N - N_V \end{pmatrix}$$

In equation 5, $I_{(A \times A)}$ represents a unit matrix having a size of "A," and $0_{(A \times C)}$ represents a matrix in which all A rows and C columns have a value of zero.

The delay path detection unit 220 detects a multi-path delay position of a radio channel.

The channel estimation error compensation unit 230 according to the present invention performs an inverse matrix operation with respect to the detected delay path position, as shown in equation 6.

$$h_{prop.1} = \psi_{prop.2} \tilde{h}_{LS}, (\psi_{prop.1} = \tilde{D}^T (\tilde{D}\tilde{Q}\tilde{D}^T)^{-1}\tilde{D}) \quad (6)$$

In equation 6, $h_{prop.1}$ represents a channel impulse response (CIR) vector obtained according to the present invention, and $\tilde{D}$ is expressed as equation 7 with respect to a detected delay path position $\bar{\tau}_l$.

$$[\tilde{D}]_{n,k} = \delta[n-l] \cdot \delta[k-\bar{\tau}_l], (0 \leq n, l < \bar{L}, 0 \leq k < M) \quad (7)$$

In equation 7, $\delta[n]$ represents a Kronecker delta function, which equals 1 for n=0, and 0 for all other n. In addition, $\bar{L}$ represents the greatest value of delay path sample positions which can be generated.

The aim of present invention is to increase the accuracy of delay path position detection for a multi-path channel through the extended Inverse Fast Fourier Transform, to extract channel estimation error components for the detected delay path, and to compensate for the error components through an inverse matrix operation.

In this case, since the complexity "$O(L^3)$" required for the inverse matrix operation for the number L of detected delay paths is much lower than the complexity "$O(N^3)$" required for the inverse matrix operation of the LMMSE scheme, which is the optimal channel estimation scheme, it is possible to easily implement a receiver. For reference, the number L of delay paths is usually set to 6 or so, and the size N of FFT is set in a range of 64 to 8192.

In the operation of the present invention, the complexity of the inverse matrix operation can be reduced through an iteration execution procedure as equation 8.

$$h_{prop.2}^{(i)} = \tilde{D}^T(\tilde{D}h_{prop.2}^{(i)} + Z_{diag}^{-1} Z_{off-diag} \tilde{D} h_{prop.2}^{(i-1)}), \quad (h_{prop.2}^{(0)} = \tilde{h}_{LS}) \quad (8)$$

In equation 8, $Z_{diag}$ and $Z_{off-diag}$ represent a matrix constituted by only diagonal components of $Z = \tilde{D}\tilde{Q}\tilde{D}^T$, and a matrix constituted by only off-diagonal components of $Z = \tilde{D}\tilde{Q}\tilde{D}^T$, respectively. In addition, the superscript (i) represents the number of iterations. When the number of iterations is increased to infinity, a result as equation 6 is produced. That is, equation 8 is an alterative equation used when inverse matrix calculation as equation 6 causes a high time complexity. When the number of iterations has an appropriate value, it is possible to derive a similar result, with a complexity lower than that required in equation 6.

The principal complexity of a complex multiplication operation required for the present invention may be expressed as $O(L^3 + M \log_2 M)$ based on equation 6, and $O(N_{iter}L + M \log_2 M)$ based on equation 8.

When the conventional channel estimation error compensation method is a kind of successive interference cancellation (SIC) type, the method according to the present invention, the operation complexity of which is reduced as shown in equation 8, may be called a kind of parallel interference cancellation (PIC) type.

When a final channel impulse response value obtained through the step is $h_{prop}$, a final channel frequency response value $H_{prop}$ obtained through transformation by the second Fast Fourier Transform unit 240 is expressed as equation 9.

$$H_{prop} = \tilde{G}F_M h_{prop} \quad (9)$$

The following operations by the channel equalizer 190 and the decoder 200 are easily appreciated by those skilled in the art, so a detailed description thereof will be omitted.

Hereinafter, the procedure will be described in more detail with reference to FIGS. 7A to 7F.

FIGS. 7A to 7F are views explaining an example of the operation according to the present invention. Here, for simplification of the description of the present invention, noise components, except for channel components, will not be expressed. The same noise removal method as that in the conventional DFT-based channel estimation scheme is used.

Figure 7A:
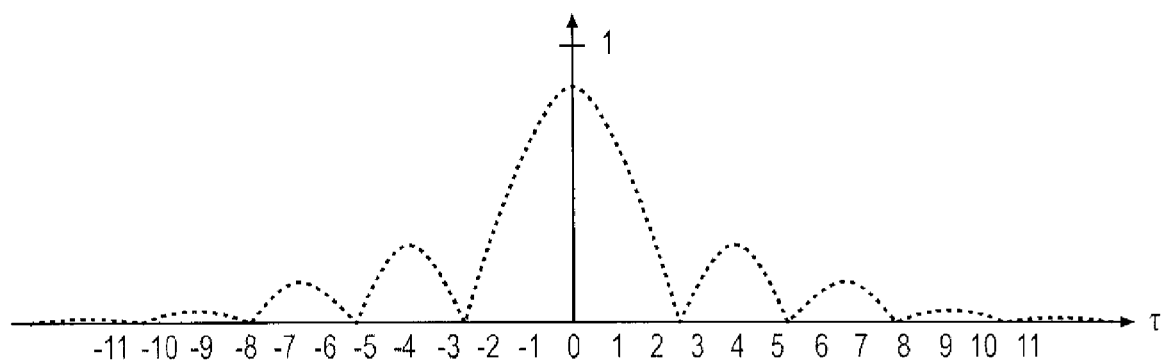
FIGS. 7A to 7F are views explaining a channel estimation error compensation method according to an exemplary embodiment of the present invention.

FIG. 7A shows a modified non-ideal autocorrelation function. Since the Inverse Fast Fourier Transform unit used in the channel impulse response (CIR) detection procedure is extended by the power of 2 in size, the non-ideal autocorrelation function representing a channel dispersion effect is also extended accordingly.

Figure 7B:
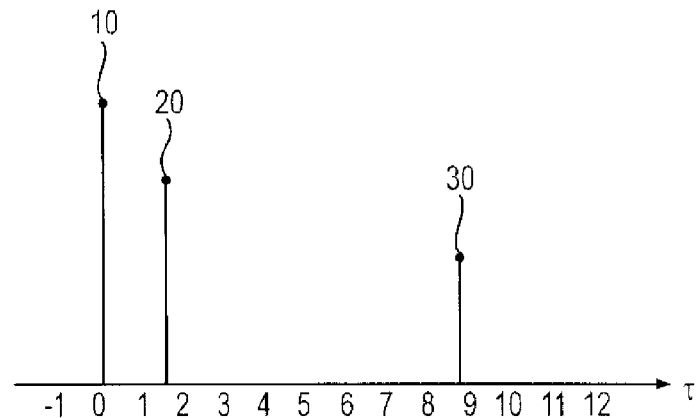

FIG. 7B shows a power distribution according to a delay path of a channel. In this case, similar to the above description of the problems of the prior method, dense channel delay positions and non-sample-spaced delay positions are taken into consideration. That is, the CIR value of Number 10 is close to the CIR value of Number 20, thereby causing initial error. The delay positions of CIR values of Numbers 20 and 30 which do not correspond to integer times of sample spaces, respectively, are taken into consideration.

Figure 7C:
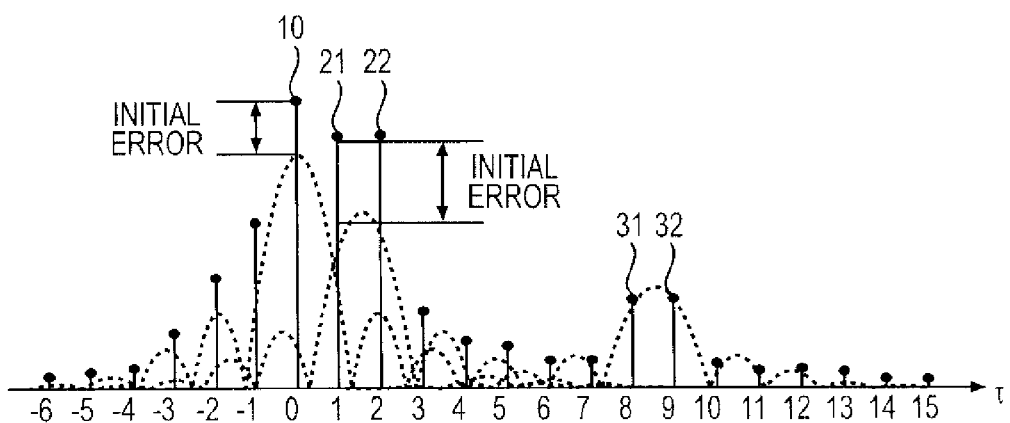

FIG. 7C shows a power distribution of a channel which can be observed by a receiving side. In this case, the CIR value of Number 20 is divided into CIR values of Numbers 21 and 22, and is observed. Also, the CIR value of Number 30 is divided into CIR values of Numbers 31 and 32, and is observed. In addition, dispersed channel components exist around each CIR value.

Figure 7D:
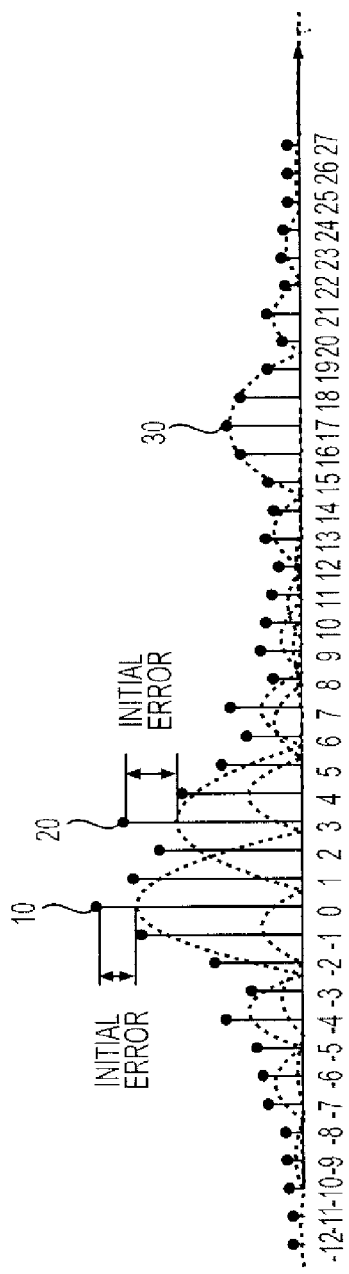

FIG. 7D shows a power distribution of a channel which is observed through the extended Inverse Fast Fourier Transform unit according to the present invention. In this case, the extension multiple is set to 2. As compared with FIG. 7C, FIG. 7D shows that the precision on the time axis is enhanced to double, so that the number of observed CIR values increases to double. Also, the probability that an ideal CIR value is located within integer times of a sample space.

Figure 7E:
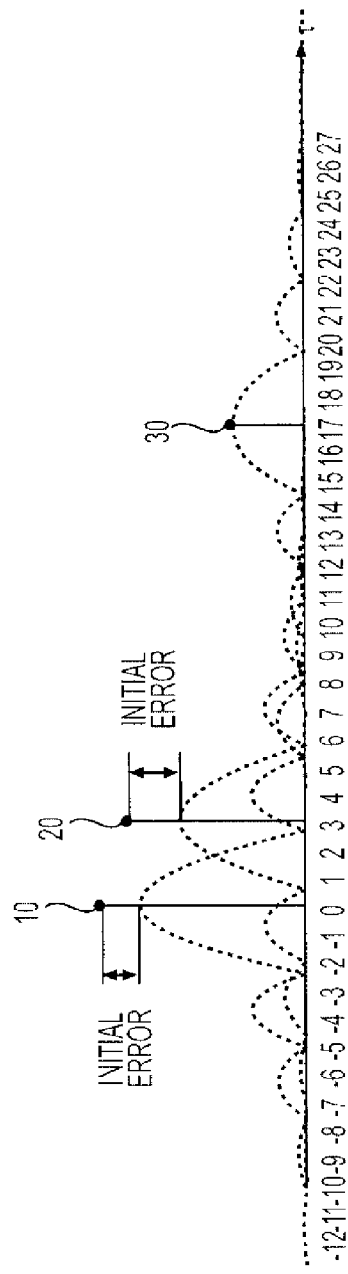

FIG. 7E shows useful CIR values including initial error, after channel components, except for useful CIR values, have been removed. Selected useful CIR values pass through the channel estimation error compensation unit according to the present invention.

Figure 7F:
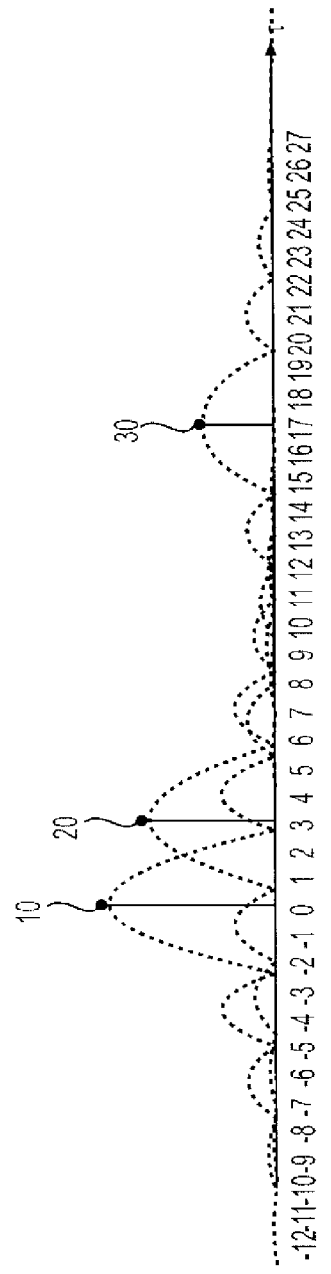

FIG. 7F shows a result obtained through the channel estimation error compensation unit according to the present invention. In this case, the selected useful CIR values are compensated for the initial error, and approximate to ideal CIR values. In this case, since the result of FIG. 7F shows a form where a time axis is extended to double, it is necessary to transform a channel impulse response (CIR) value into a channel frequency response (CFR) value of a frequency domain channel, through Fast Fourier Transform which is extended to double. When a doubly-extended channel frequency response (CFR) value is obtained through the step, an equalization operation is performed on channel distortion of data subcarrier positions by using only a channel frequency response (CFR) value within a useful band.

Figure 8:
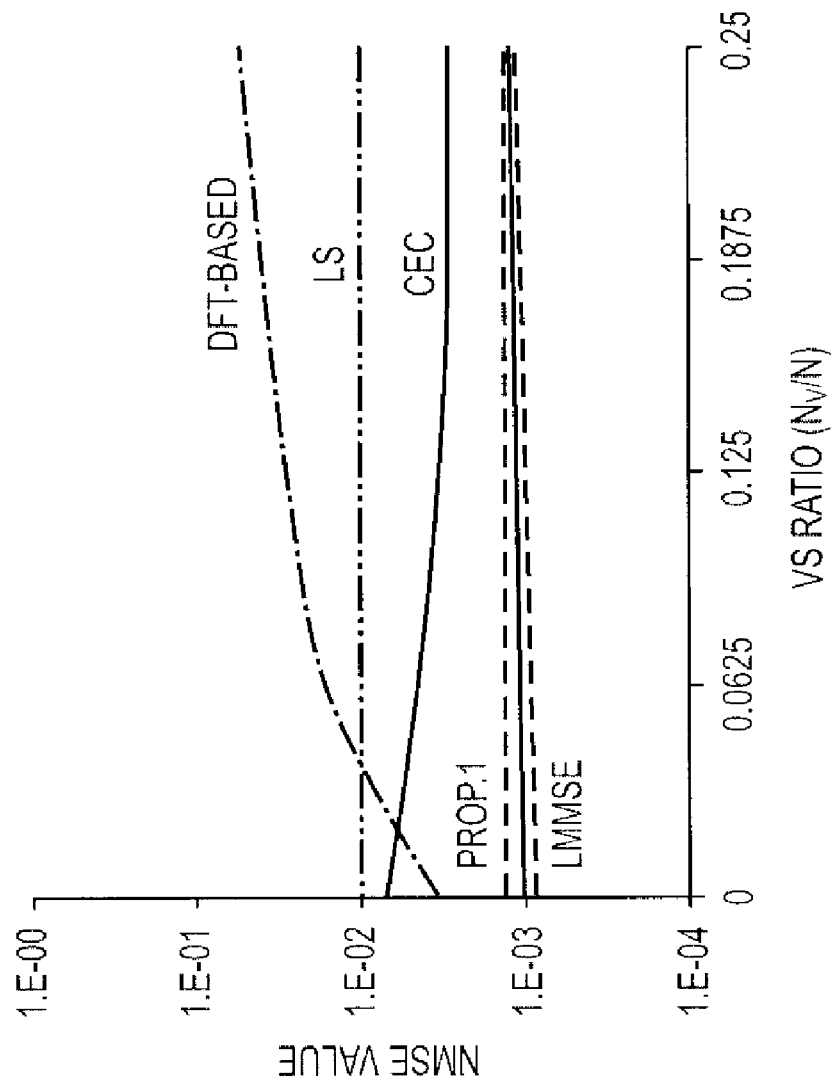
FIG. 8 is a graph showing the performance of the present invention for a sample-spaced channel model.
Figure 9:
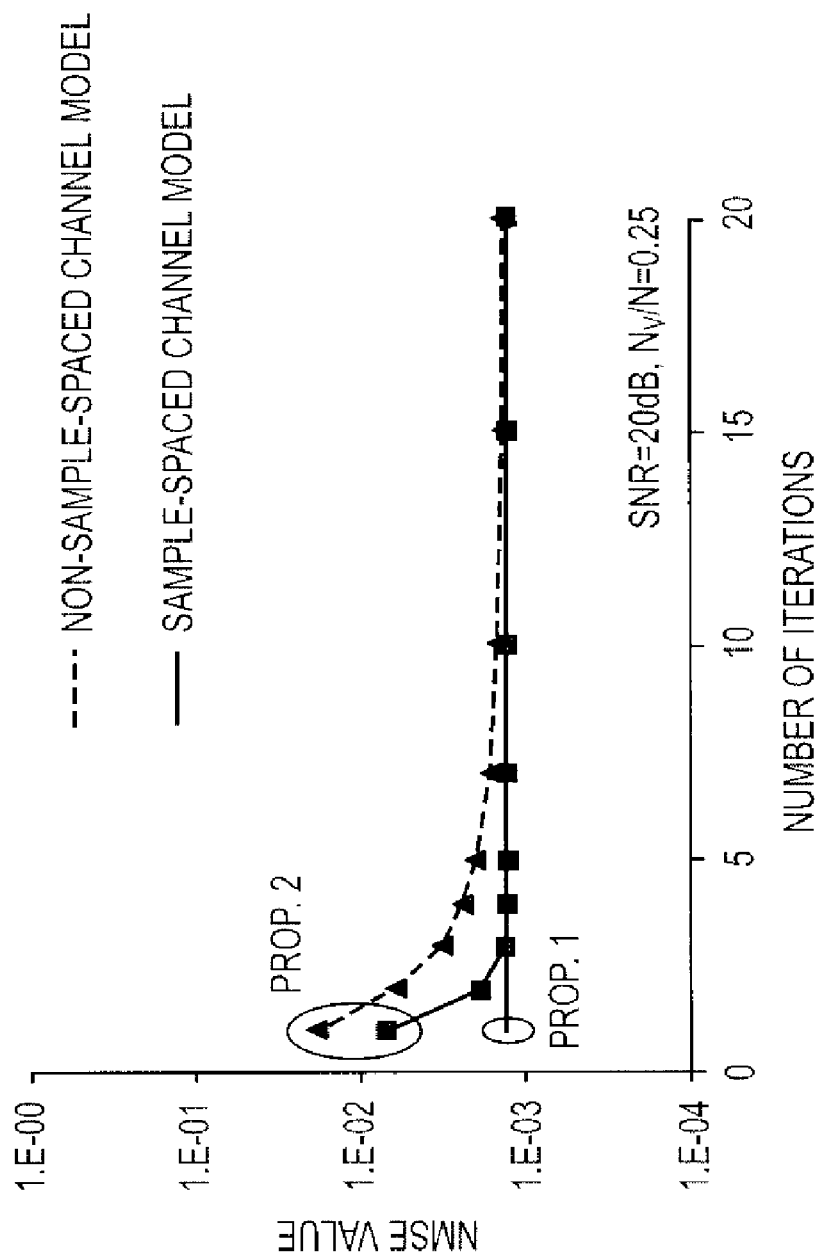
FIG. 9 is a graph showing the performance of the present invention for a non-sample-spaced channel model.

FIG. 8 is a graph showing the performance of the present invention for a sample-spaced channel model, and FIG. 9 is a graph showing the performance of the present invention for a non-sample-spaced channel model.

Simulations for verifying the performance of the present invention were performed using ITU-indoor office A and ITU-indoor office B models, which are typical indoor wireless communication channel environments. Here, ITU-indoor office B is a sample-spaced channel model, and represents a special channel environment in which the conventional technology is estimated to have a relatively high performance. ITU-indoor office A is a non-sample-spaced channel model, includes dense delay paths and delay paths corresponding to a decimal fraction times of a sample space, and represents an example of a general channel environment in which a performance deterioration problem of the conventional technology and the superiority of the present invention are shown. The principal parameters for the simulations were set as follows: the size of FFT was set to N=64; the number $N_U$ of useful subcarriers was set to $48 \leqq N_U \leqq 64$; the number $N_V$ of virtual subcarriers in a guard band was set to $0 \leqq N_V \leqq 16$; and a sampling frequency was set to 20 MHz. Also, the size M of FFT required for the operation of the present invention was set to 512, which is eight times as large as N.

As a performance estimation indicator for confirming the superiority of the present invention, the Normalized Mean Square Error (NMSE) is employed as shown in equation 10.

$$NMSE = \frac{E[(H_{est.} - H)^H (H_{est.} - H)]}{E[H^H H]} \quad (10)$$

In equation 10, $H_{est}$ represents an estimation value for an ideal channel frequency response (CFR) matrix H. The meanings of waveforms shown in the drawings are as follows.

1) "LS" represents an initial channel estimation value by a Least Square scheme.

2) "DFT-based" represents a typical DFT-based channel estimation value (except for a channel estimation error compensation part).

3) "CEC" represents a DFT-based channel estimation value to which a conventional channel estimation error compensation part is added.

4) "Prop.1" represents a DFT-based channel estimation value to which a channel estimation error compensation part according to the present invention is added.

5) "Prop.2" represents a form where the complexity of the "Prop.1" according to the present invention is reduced.

6) "LMMSE" represents an LMMSE-based channel estimation value, which is the optimal channel estimation scheme.

Referring to FIG. 8, it can be understood that the DFT-based channel estimation scheme has a lower performance than the LS scheme, which is an initial channel estimation scheme, at a predetermined VS ratio ($N_V/N$) or less, and that such a problem can be solved by the conventional CEC scheme and by the Prop.1 scheme according to the present invention. Especially, it can be confirmed that the performance of the present invention more approximates that of the LMMSE scheme, which is the optimal channel estimation scheme.

Also, referring to FIG. 9, it can be confirmed for a non-sample-spaced channel model that the performance of the conventional CEC scheme is somewhat deteriorated while the entire performance aspects are similar to those shown in FIG. 8. This is a problem occurring when the general radio channel environment is taken into consideration. However, the principal feature is that the performance of the present invention is still superior to that of the conventional technology, and still approximates that of the LMMSE scheme, which is the optimal channel estimation scheme.

Referring to the performance graph, it can be understood that, as compared with the Prop.1 scheme of the present invention, the Prop.2 scheme of the present invention has a performance capable of sufficiently converging with the number of iterations from 3 to 10 for the respective channel models.

Although the method for compensating for error components according to an exemplary embodiment of the present invention has been described with detailed equations, the equations are presented only for convenience of description. Therefore, it goes without saying that the present invention can be applied to any method for removing error components through an inverse matrix operation, other than the conventional successive method.

In addition, while the invention has been shown and described with reference to a certain exemplary embodiment thereof, the invention is not limited to the exemplary embodiment, those skilled in the art may make various changes in form and details without departing from the scope of the invention which are defined by the appended claims, and it should be understood that the spirit and scope of the invention are to cover such various changes in form and details.

What is claimed is:

1. A channel estimation method in a radio communication system comprising the steps of:
   transforming a received OFDM signal into a frequency domain;
   estimating a channel frequency response (CFR) value from a result value obtained through the transformation by using a pilot signal;
   transforming the estimated CFR value into a time domain through an extended Inverse Fast Fourier Transform scheme, and detecting a channel impulse response (CIR) value;
   detecting a delay path position of a channel;
   modifying a non-ideal autocorrelation function; and
   compensating the detected CIR value for error, through use of the detected delay path position and the non-ideal autocorrelation function.

2. The method as claimed in claim 1, wherein the delay path position and the non-ideal autocorrelation function are constructed in the form of a matrix, and the step of compensating the detected CIR value for error is performed in such a manner as to calculate a channel estimation error cause matrix from the delay path position matrix and the non-ideal autocorrelation matrix, and then to compensate the detected CIR value for the channel estimation error cause matrix through an inverse matrix operation.

3. The method as claimed in claim 2, wherein the step of compensating the detected CIR value for error is performed by calculating:

$$h_{prop.1} = \psi_{prop.1} \tilde{h}_{LS}, (\psi_{prop.1} = \tilde{D}^T(\tilde{D}\tilde{Q}\tilde{D}^T)^{-}\tilde{D}),$$

wherein $h_{prop.1}$ represents a detected CIR matrix, $[\tilde{D}]_{n,k} = \delta[n-1] \cdot \delta[k-\bar{\tau}_l]$, $(0 \leq n, 1 < \bar{L}, 0 \leq k < M)$, and $\bar{\tau}_l$ represents a detected delay path position.

4. The method as claimed in claim 1, wherein the step of compensating the detected CIR value for error is performed by calculating:

$$h_{prop.2}^{(i)} = \tilde{D}^T(\tilde{D}h_{prop.2}^{(i)} + Z_{diag}^{-1}Z_{off-diag}\tilde{D}h_{prop.2}^{(i-1)}),$$
$$(h_{prop.2}^{(0)} = \tilde{h}_{LS}),$$

wherein $Z_{diag}$ represents a matrix constituted by only diagonal components of $Z = \tilde{D}\tilde{Q}\tilde{D}^T$, $Z_{off-diag}$ represents a matrix constituted by only off-diagonal components of $Z = \tilde{D}\tilde{Q}\tilde{D}^T$, and "(i)" represents the number of iterations.

5. The method as claimed in claim 4, wherein the "(i)" has a value selected from a range of three to ten.

6. The method as claimed in claim 1, wherein the step of transforming the estimated CFR value into a time domain is performed through Inverse Fast Fourier Transform, and the size of an Inverse Fast Fourier Transform unit is extended by the power of 2.

7. A channel estimation device in a radio communication system comprising:
   a first Fast Fourier Transform unit for transforming a received OFDM signal into a frequency domain;
   a channel estimation unit channel for estimating a channel frequency response (CFR) value from a result value obtained through the transformation by using a pilot signal;
   an Inverse Fast Fourier Transform unit for transforming the estimated CFR value into a time domain through an Inverse Fast Fourier Transform scheme, and detecting a channel impulse response (CIR) value;
   a delay path detection unit for detecting a delay path position; and
   a channel estimation error compensation unit for calculating a modified non-ideal autocorrelation function, and compensating the detected CIR value for an error value, through use of the delay path position and the non-ideal autocorrelation function.

8. The device as claimed in claim 7, wherein the delay path position and the non-ideal autocorrelation function are constructed in the form of a matrix, and the channel estimation error compensation unit calculates a channel estimation error cause matrix using the delay path position matrix and the non-ideal autocorrelation matrix, and performs a calculation operation of applying the channel estimation error cause matrix to the detected CIR value in the form of an inverse matrix.

9. The device as claimed in claim 7, wherein the Inverse Fast Fourier Transform unit transforms the estimated channel frequency response (CFR) value into a time domain through Inverse Fast Fourier Transform, and extends a size of Inverse Fast Fourier Transform by the power of 2 when the Inverse Fast Fourier Transform is performed.

10. The device as claimed in claim 7, wherein the radio communication system is based on one among IEEE 802.16d/e standard, WiBro, and WiMAX.

* * * * *